United States Patent
Kwack et al.

(10) Patent No.: US 11,322,800 B2
(45) Date of Patent: *May 3, 2022

(54) COMPOSITE SEPARATOR INCLUDING POROUS SUBSTRATE, HEAT-RESISTANT COATING LAYER, AND ELECTRODE ADHESIVE LAYER AND ELECTROCHEMICAL DEVICE USING THE SAME

(71) Applicants: SK Innovation Co., Ltd., Seoul (KR); SK IE TECHNOLOGY CO., LTD., Seoul (KR)

(72) Inventors: Won Sub Kwack, Daejeon (KR); Min Sang Park, Daejeon (KR); Yun Bong Kim, Daejeon (KR); Dong Yeon Lee, Daejeon (KR); Kyu Young Cho, Daejeon (KR)

(73) Assignees: SK INNOVATION CO., LTD., Seoul (KR); SK IE TECHNOLOGY CO., LTD., Seoul (KR)

( * ) Notice: Subject to any disclaimer, the term of this patent is extended or adjusted under 35 U.S.C. 154(b) by 104 days.

This patent is subject to a terminal disclaimer.

(21) Appl. No.: 16/660,406

(22) Filed: Oct. 22, 2019

(65) Prior Publication Data

US 2020/0127266 A1    Apr. 23, 2020

(30) Foreign Application Priority Data

Oct. 23, 2018    (KR) .................. 10-2018-0126702

(51) Int. Cl.
*H01M 50/449* (2021.01)
*H01M 50/411* (2021.01)
*H01M 50/46* (2021.01)

(52) U.S. Cl.
CPC ....... *H01M 50/449* (2021.01); *H01M 50/411* (2021.01); *H01M 50/461* (2021.01)

(58) Field of Classification Search
CPC . H01M 50/449; H01M 50/461; H01M 50/411
USPC ........................ 429/144, 251, 254
See application file for complete search history.

(56) References Cited

U.S. PATENT DOCUMENTS

| | | | | |
|---|---|---|---|---|
| 2005/0176576 A1* | 8/2005 | Katori | .............. | H01M 4/8605 502/101 |
| 2015/0050544 A1* | 2/2015 | Nam | .............. | H01M 50/449 429/145 |
| 2015/0140403 A1* | 5/2015 | Moon | .............. | H01M 10/058 429/144 |
| 2015/0200388 A1* | 7/2015 | Yoshitomi | .......... | H01M 50/449 429/145 |
| 2015/0263325 A1 | 9/2015 | Honda et al. | | |
| 2015/0311490 A1* | 10/2015 | Murase | .............. | H01M 10/0525 429/131 |
| 2016/0141581 A1* | 5/2016 | Sasaki | .............. | H01M 10/0525 429/144 |
| 2018/0315971 A1* | 11/2018 | Kwon | ................ | H01M 50/411 |
| 2019/0144590 A1* | 5/2019 | Epps, III | .............. | C07C 41/18 429/308 |
| 2020/0127261 A1* | 4/2020 | Kwack | .............. | H01M 50/461 |

FOREIGN PATENT DOCUMENTS

| | | | | |
|---|---|---|---|---|
| JP | 4414165 | | 2/2010 | |
| JP | 2015-053118 A | | 3/2015 | |
| JP | 2016-213019 A | | 12/2016 | |
| KR | 10-2015-0089000 A | | 8/2015 | |
| KR | 20160041496 A | † | 4/2016 | |
| KR | 1020160041496 A | | 4/2016 | |
| KR | 20160109669 A | * | 9/2016 | |
| KR | 20160109669 A | † | 9/2016 | |
| KR | 10-1854716 B1 | | 5/2018 | |
| WO | WO-2017082671 A | * | 5/2017 | .......... H01M 50/446 |

OTHER PUBLICATIONS

Extended Search Report issued by European Patent Office dated Feb. 24, 2020.

* cited by examiner
† cited by third party

*Primary Examiner* — Sean P Cullen
(74) *Attorney, Agent, or Firm* — IP & T Group LLP

(57) ABSTRACT

Provided are a separator for a secondary battery and an electrochemical device using the same. More specifically, provided is a composite separator having a more excellent cycle life and including a coating layer which is not easily swollen in an electrolyte solution. In the composite separator for a secondary battery according to an aspect of the present invention, distortion or lifting phenomenon is suppressed even when the heat and pressure are applied without significant decrease in permeability of the separator.

5 Claims, No Drawings

COMPOSITE SEPARATOR INCLUDING POROUS SUBSTRATE, HEAT-RESISTANT COATING LAYER, AND ELECTRODE ADHESIVE LAYER AND ELECTROCHEMICAL DEVICE USING THE SAME

CROSS-REFERENCE TO RELATED APPLICATIONS

This application claims priority under 35 U.S.C. § 119 to Korean Patent Application No. 10-2018-0126702, filed on Oct. 23, 2018, in the Korean Intellectual Property Office, the disclosure of which is incorporated herein by reference in its entirety.

TECHNICAL FIELD

The following disclosure relates to a separator for a secondary battery and an electrochemical device using the same.

More particularly, the following disclosure relates to a composite separator having a more excellent cycle life and including a coating layer which does not easily swell in an electrolyte solution.

BACKGROUND

Recently, a secondary battery having high capacity and a large size, which is applied to an electric automobile, or the like, has been developed. As part of that development, an electrode-separator assembly technique in which an electrode and a separator are stacked and integrated has been used.

However, this type of electrode-separator assembly may cause lifting phenomenon or distortion in the preparation or during the use, resulting in a decrease in efficiency, such as failing to achieve a desired high capacity. Also, it is difficult to enlarge the size due to the occurrence of distortion, or the like.

Furthermore, a gap may be formed between an electrode and a separator according to charge and discharge, which is a factor that deteriorates a cycle life. Therefore, it is an important technique to maintain uniformly adhesiveness of an adhesive part in an electrode or a separator.

To solve the above problems, there is a technique used by coating acryl-based resins or modified fluorine-based resins on a surface in contact with an electrode, but these resins are easily swollen or decomposed in an electrolyte solution, resulting in an adverse effect on a battery cycle life.

RELATED ART DOCUMENT

Patent Document (Patent Document 1) Japanese Patent Publication No. 4414165 (2009.11.27)

SUMMARY

The present invention is intended to solve the above problems, and forms a specialized polyolefin-based latex on the surface of a separator in contact with an electrode surface as an electrode adhesive layer, thereby solving the above problems.

An embodiment of the present invention is directed to providing a composite separator without lifting phenomenon of the electrode surface and the separator surface when heat and pressure are applied in the process of integrating the electrode and the separator.

Another embodiment of the present invention is directed to providing a composite separator capable of maintaining a battery cycle life for a long time without easy swelling or decomposing in an electrolyte solution.

Another embodiment of the present invention is directed to providing a composite separator including a coating layer in which slip properties are improved to improve assemblability between the electrode surface and the separator when a composite separator is manufactured, the composite separator is easily seated on an electrode surface due to slip properties or the like upon assembly, such that no wrinkles occur, and also no distortion or lifting phenomenon occurs between the electrode and the separator.

Another embodiment of the present invention is directed to providing a composite separator that allows the manufacture of a battery having excellent cycle characteristics and capable of achieving a desired high capacity by the above-described advantages.

In one general aspect, there is provided a composite separator including a porous substrate, a heat-resistant coating layer formed on the porous substrate, and an electrode adhesive layer, wherein the electrode adhesive layer includes polyolefin-based organic particles, and a Gurley permeability satisfies the following Equation 1 and a Gurley permeability change rate ($\Delta P$) satisfies the following Equation 2:

$$G_1 \leq 300 \quad \text{[Equation 1]}$$

$$10\% \leq \Delta P \leq 50\% \quad \text{[Equation 2]}$$

wherein $\Delta P=(G_2-G_1)/G_1 \times 100$, $G_2$ is a Gurley permeability measured according to ASTM D726 in a state where the composite separator is stacked between two TEFLON® (PTFE, Polytetrafluoroethylene, Registered trademark of Dupont Inc.) sheets, the composite separator and the TEFLON® sheets are pressed and fused at 4 MPa and 70° C., and the TEFLON® sheets are then removed, and $G_1$ is a Gurley permeability of the composite separator before fusion, where a unit of the Gurley permeability is sec/100 cc.

Other features and aspects will be apparent from the following detailed description and the claims.

DETAILED DESCRIPTION OF EMBODIMENTS

Hereinafter, the present invention will be described in more detail with reference to Examples and Comparative Examples. The following Examples are only a reference for describing the present invention in detail, and the present invention is not limited thereto and may be implemented in various forms.

In addition, all technical terms and scientific terms have the same meanings as those commonly understood by a person skilled in the art to which the present invention pertains unless otherwise defined. The terms used herein are only for effectively describing certain embodiments, and not intended to limit the present invention.

In addition, singular forms used in the specification and the appended claims are intended to include the plural forms as well unless otherwise indicated in context.

An aspect of the present invention provides a composite separator including a porous substrate, a heat-resistant coating layer formed on the porous substrate, and an electrode adhesive layer, wherein the electrode adhesive layer includes polyolefin-based organic particles, and a Gurley permeability satisfies the following Equation 1 and a Gurley permeability change rate (ΔP) satisfies the following:

$$G_1 \leq 300 \quad \text{[Equation 1]}$$

$$10\% \leq \Delta P \leq 50\% \quad \text{[Equation 2]}$$

wherein $\Delta P=(G_2-G_1)/G_1 \times 100$, $G_2$ is a Gurley permeability measured according to ASTM D726 in a state where the composite separator is stacked between two TEFLON® sheets, the composite separator and the TEFLON® sheets are pressed and fused at 4 MPa and 70° C., and the TEFLON® sheets are then removed, and $G_1$ is a Gurley permeability of the composite separator before fusion, where a unit of the Gurley permeability is sec/100 cc.

The electrode adhesive layer may include 0.5 to 2 g/m² of polyolefin-based organic particles.

The polyolefin-based organic particles may have an average particle size of 0.01 to 0.5 μm.

The polyolefin-based organic particles may be spherical particles.

The polyolefin-based organic particles may have a melting temperature of 120° C. or more and a glass transition temperature of −30 to 10° C.

The polyolefin-based organic particles may have a weight change rate of less than 50% according to the following Equation 3 upon immersion in an electrolyte solution:

$$\text{Weight change rate}=(W2-W1)/W1 \times 100$$

wherein W2 is a weight measured after immersion in the electrolyte solution for 3 days, and W1 is a weight measured before immersion in the electrolyte solution.

The electrode adhesive layer may have a thickness of 0.1 to 3 μm.

The composite separator may have a peel strength of 10 to 100 gf/25 mm, when the composite separator is stacked on a carbon sheet having a thickness of 200 μm so that the electrode adhesive layer faces the carbon sheet, the composite separator and the carbon sheet are pressed and fused at 4 MPa and 70° C. for 1 second, and then subjected to a 180 degree peel test.

Another aspect of the present invention is an electrochemical device comprising the composite separator.

In an aspect of the present invention, the electrochemical device may be a lithium secondary battery.

Hereinafter, each configuration of the present invention will be described in more detail.

[Porous Substrate]

In an aspect of the present invention, the porous substrate is not limited as long as it is usually used as a separator of a secondary battery.

For example, the porous substrate may be a woven fabric, a non-woven fabric, and a porous film. The porous substrate may also be a multilayer stacked with one or more of those mentioned above. The material of the porous substrate is not limited, but specifically, may be, for example, formed of any one or a mixture of two or more selected from the group consisting of polyethylene, polypropylene, polybutylene, polypentene, polymethylpentene, polyethylene terephthalate, polybutylene terephthalate, polyacetal, polyamide, polycarbonate, polyimide, polyether sulfone, polyphenylene oxide, polyphenylene sulfide, polyethylene naphthalene, and a copolymer thereof.

A thickness of the porous substrate is not limited, and may be usually 1 to 100 μm, which is a range used in the art, specifically 5 to 50 μm, and more preferably 6 to 30 μm, but is not limited thereto.

[Heat-Resistant Coating Layer]

In an aspect of the present invention, the heat-resistant coating layer may be an inorganic particle layer. In addition, the heat-resistant coating layer may include a high heat-resistant polymer material having high heat resistance and inorganic particles. The high heat-resistant polymer material may be specifically selected from, for example, acryl-based resin; fluorine-based polymers such as polyvinylidene fluoride; polyamide-based or polyimide-based polymers such as polyamide 6, polyamide 66, polyamide 11, polyamide 12, aromatic polyamide, and polyimide. However, the high heat-resistant polymer material is not limited as long as it is a heat-resistant polymer usually used in the art.

As the inorganic particles, specifically, boehmite, calcium carbonate, talc, clay, kaolin, silica, hydrotalcite, diatomite, magnesium carbonate, barium carbonate, calcium sulfate, magnesium sulfate, barium sulfate, aluminum hydroxide, magnesium hydroxide, calcium oxide, magnesium oxide, titanium oxide, alumina, mica, zeolite, glass, or the like may be, for example, used. In addition, as inorganic particles having a dielectric constant of 5 or more, any one or a mixture of two or more selected from $SrTiO_3$, $SnO_2$, $CeO_2$, MgO, NiO, CaO, ZnO, $ZrO_2$, $Y_2O_3$, $Al_2O_3$, $TiO_2$, or SiC may be used. Further, as inorganic particles having piezoelectricity, any one or a mixture of two or more selected from $BaTiO_3$, $Pb(Zr,Ti)O_3$ (PZT), $Pb_{1-x}La_xZr_{1-y}TiyO_3$ (PLZT), $PB(Mg_3Nb_{2/3})O_3$—$PbTiO_3$ (PMN-PT), or hafnia ($HfO_2$) may be used. Further, as inorganic particles having a lithium ion transfer capacity, any one or a mixture of two or more selected from the following may be used: lithium phosphate ($Li_3PO_4$), lithium titanium phosphate ($Li_xTi_y(PO_4)_3$, $0<x<2$, $0<y<3$), lithium aluminum titanium phosphate ($Li_xAl_yTi_x(PO_4)_3$, $0<x<2$, $0<y<1$, $0<z<3$), $(LiAlTiP)_xO_y$ series glass ($0<x<4$, $0<y<13$), lithium Lanthanum titanate ($Li_xLa_yTiO_3$, $0<x<2$, $0<y<3$), lithium germanium thiophosphate ($Li_xGe_yP_zS_w$, $0<x<4$, $0<y<1$, $0<z<1$, $0<w<5$), lithium nitride ($Li_xN_y$, $0<x<4$, $0<y<2$), $SiS_2$ ($Li_xSi_yS_x$, $0<x<3$, $0<y<2$, $0<z<4$) series glass, or $P_2S_5$ ($Li_xP_yS_z$, $0<x<3$, $0<y<3$, $0<z<7$) series glass. When inorganic particles having a high dielectric constant, inorganic particles having piezoelectricity, and inorganic particles having a lithium ion transfer capacity are mixed, their synergistic effect may be doubled.

The heat-resistant coating layer may form a pore structure together with the pores included in the porous substrate by adjusting the size of the inorganic particles, the content of the inorganic particles, and the composition of the inorganic particles and the binder polymer, and may also adjust the pore size and porosity.

The size of the inorganic particles is not limited, but may be 0.001 to 5 μm, specifically 0.01 to 3 μm, and more specifically 0.1 to 1 μm. In the above ranges, it is possible to form a heat-resistant coating layer having uniform thickness and to provide a suitable porosity, which is preferable.

The content of the inorganic particles is not limited, but may be 50 to 99 wt %, and more specifically 60 to 95 wt %, based on 100 wt % of the mixture of the inorganic particles and the binder in the heat-resistant coating layer.

In an aspect of the present invention, the thickness of the heat-resistant coating layer is not limited, but may be, specifically, for example, 0.5 to 10 μm, more specifically 1 to 8 μm, and most specifically 2 to 5 μm.

In an aspect of the present invention, the heat-resistant coating layer may be formed on the porous substrate. Specifically, the heat-resistant coating layer may be, for example, formed on one surface or both surfaces of the porous substrate.

[Electrode Adhesive Layer]

In an aspect of the present invention, the electrode adhesive layer satisfies the physical properties having a weight change rate of less than 50%, specifically 1 to 49%, and more specifically 10 to 45% according to the following Equation 3 upon immersion in an electrolyte solution. Thus, the composite separator according to an aspect of the present invention including the electrode adhesive layer may be prevented from swelling or decomposing by the electrolyte solution when the electrolyte solution is injected after manufacture of the electrode assembly.

Accordingly, when applying the composite separator according to an aspect of the present invention, the phenomenon of swelling or decomposition by the electrolyte solution may be significantly reduced, thereby further improving the cycle characteristics of the battery.

When the weight change rate was 50% or more, it was shown that the initial life was very low when the battery life characteristics were measured.

The weight change rate was measured as follows. An aqueous slurry containing the polyolefin-based organic particles used in the electrode adhesive layer of the present invention was placed on a TEFLON® petridish, and then water was evaporated at 60° C. for 1 day to prepare a film. Then, after being left for 3 days in a state in which 1 g of the film is immersed in the electrolyte solution, the electrolyte solution was decanted, and then the film weight was measured to calculate the weight change rate.

$$\text{Weight change rate} = (W2-W1)/W1 \times 100 \quad [\text{Equation 3}]$$

wherein W2 is a weight measured after immersion in the electrolyte solution for 3 days, and W1 is a weight measured before immersion in the electrolyte solution.

Here, the electrolyte solution may be used without limitation as long as it is usually used in the art. For example, any one or a mixed solvent of two or more selected from organic solvents such as carbonate-based solvents, nitrile-based solvents, ester-based solvents, ether-based solvents, ketone-based solvents, glyme-based solvents, alcohol-based solvents, and aprotic solvents; and water may be used. In addition, the electrolyte solution may further include a lithium salt in addition to the above solvents.

As the carbonate-based solvents, any one or a mixture of two or more selected from ethylene carbonate, propylene carbonate, butylene carbonate, ethyl methyl carbonate, ethyl propyl carbonate, methyl propyl carbonate, dimethyl carbonate, diethyl carbonate, and dipropyl carbonate may be used, but is not limited thereto.

As the nitrile-based solvents, any one or a mixture of two or more selected from acetonitrile, succinonitrile, adiponitrile, and sebaconnitrile may be used, but is not limited thereto.

As the ester-based solvents, any one or a mixture of two or more selected from methyl acetate, ethyl acetate, n-propyl acetate, 1,1-dimethylethyl acetate, methyl propionate, ethyl propionate, γ-butyrolactone, decanolide, valerolactone, mevalonolactone, and caprolactone may be used, but is not limited thereto.

As the ether-based solvents, any one or a mixture of two or more selected from dimethyl ether, dibutyl ether, tetraglyme, diglyme, dimethoxyethane, 2-methyltetrahydrofuran, and tetrahydrofuran may be used, but is not limited thereto.

As the ketone-based solvents, cyclohexanone, or the like may be used.

As the glyme-based solvents, any one or a mixture of two or more selected from ethylene glycol dimethyl ether, triethylene glycol dimethyl ether, and tetraethylene glycol dimethyl ether may be used, but is not limited thereto.

As the alcohol-based solvents, ethyl alcohol, isopropyl alcohol, or the like may be used. As the aprotic solvents, nitriles such as R—CN (where R is a linear, branched or cyclic $C_2$-$C_{20}$ hydrocarbon group; and may include double bond aromatic rings or ether bonds); amides such as dimethylformamide; dioxolanes such as 1,3-dioxolane; sulfolanes, or the like may be used.

The lithium salt may be any one or a mixture of two or more selected from lithium hexafluorophosphate ($LiPF_6$), lithium tetrafluoroborate ($LiBF_4$), lithium hexafluoroantimonate ($LiSbF_6$), lithium hexafluoroarsenate ($LiAsF_6$), lithium difluoromethanesulfonate ($LiC_4F_9SO_3$), lithium perchlorate ($LiClO_4$), lithium aluminate ($LiAlO_2$), lithium tetrachloroaluminate ($LiAlCl_4$), lithium chloride (LiCl), lithium iodide (LiI), lithium bisoxalato borate ($LiB(C_2O_4)_2$), lithium trifluoromethanesulfonylimide ($LiN(C_xF_{2x+1}SO_2)(C_yF_{2y+1}SO_2)$) (where x and y are natural numbers), and derivatives thereof. The concentration of the lithium salt may be 0.1 to 10.0 M, and more specifically 1 to 5 M, but is not limited thereto.

More specifically, the electrolyte solution, for example, may be obtained by mixing ethylene carbonate: ethyl methyl carbonate: dimethyl carbonate in a volume ratio of 3:5:2.

In an aspect of the present invention, the polyolefin-based organic particles used in the electrode adhesive layer are preferably polyolefin-based organic particles having a melting temperature ($T_m$) of 120 to 180° C. and a glass transition temperature ($T_g$) of 10° C. or less and specifically −30 to 10° C. In addition, a temperature at which the polyolefin-based organic particles begin to melt and form a film, i.e., a film formation temperature, may be 20 to 90° C., specifically 30 to 70° C., and more specifically 50 to 60° C. When the electrode assembly is manufactured in the above range, distortion or lifting phenomenon between the electrode and the separator may be prevented from occurring so that the battery capacity may be maximized. In addition, adhesion is performed within a range that does not significantly impair the permeability of the porous substrate, thereby making it possible to maintain the inherent permeability of the separator at the maximum even after the composite separator is fused on the electrode to integrate with the electrode.

More specifically, a Gurley permeability of the composite separator may satisfy the following Equation 1 and a Gurley permeability change rate (ΔP) of the composite separator may satisfy the following Equation 2:

$$G_1 \leq 300 \quad [\text{Equation 1}]$$

$$10\% \leq \Delta P \leq 50\% \quad [\text{Equation 2}]$$

wherein $\Delta P=(G_2-G_1)/G_1 \times 100$, $G_2$ is a Gurley permeability measured according to ASTM D726 in a state where the composite separator is stacked between two TEFLON® sheets, the composite separator and the TEFLON® sheets are pressed and fused at 4 MPa and 70° C., and the TEFLON® sheets are then removed, and G1 is a Gurley permeability of the composite separator before fusion, where a unit of the Gurley permeability is sec/100 cc.

These properties, in an aspect of the present invention, seem to be due to the thermal properties of the polyolefin-based organic particles used as organic particles.

In Equations 1 and 2, $G_1$ may be 300 sec/100 cc or less, specifically 100 to 300 sec/100 cc, more specifically 150 to 250 sec/100 cc, and most specifically 200 to 220 sec/100 cc. In the above ranges, the electrochemical stability of the battery is excellent, which is preferable.

In addition, $G_2-G_1$ may be 100 sec/100 cc or less, specifically 10 to 100 sec/100 cc, more specifically 20 to 99 sec/100 cc, and most specifically 40 to 60 sec/100 cc. In the above ranges, the electrochemical stability of the battery is excellent, which is preferable.

In addition, ΔP may be 10 to 50%, specifically 15 to 40%, and more specifically 20 to 35%. In the above ranges, the electrochemical stability of the battery is excellent, which is preferable.

In an aspect of the present invention, the polyolefin-based organic particles may be polyolefin-based copolymers obtained by reacting polyolefin-based homopolymers or polyolefin-based monomers with comonomers, and more specifically comonomers such as acrylic acid, methacrylic acid, succinic acid and anhydrides thereof. More specifically, the content of the comonomer may be 0.01 to 5 mol %, and more specifically 0.5 to 3 mol % of the copolymer.

The polyolefin-based homopolymer may be polyethylene and polypropylene, and more preferably, polypropylene. In addition, as the polyolefin-based homopolymer, the copolymer of polyethylene and polypropylene is also possible.

In addition, the polyolefin-based organic particles may be a polyolefin-based latex, which is dispersed in water to maintain a spherical shape.

In an aspect of the present invention, the polyolefin-based organic particles may have a melting temperature of 120° C. or more and a glass transition temperature of −30 to 10° C. More specifically, the polyolefin-based organic particles may have a melting temperature of 120 to 180° C. or more and a glass transition temperature of −5 to 5° C. In the above ranges, it is possible to provide a composite separator having desired anti-blocking properties and a low weight change rate with respect to the electrolyte solution.

The polyolefin-based organic particles may be included in the electrode adhesive layer in an amount of 0.5 to 2 g/m², and more specifically 0.6 to 1.5 g/m². When the content of the organic particles is in the above ranges, the change in the Gurley permeability after fusion may be minimized, which is desirable.

The polyolefin-based organic particles may have an average particle size of 0.01 to 0.5 μm, and specifically 0.05 to 0.4 μm, and may be present as spherical particles in a state of being dispersed in water.

In an aspect of the present invention, the electrode adhesive layer may be formed by applying the aqueous slurry containing 1 to 30 wt % and more specifically 5 to 15 wt % of the polyolefin-based organic particles, and 70 to 99 wt % and more specifically 85 to 95 wt % of water.

In an aspect of the present invention, the electrode adhesive layer may be formed on the heat-resistant coating layer. Specifically, the heat-resistant coating layer, for example, may be formed on one surface or both surfaces of the porous substrate, and the electrode adhesive layer may be formed on the heat-resistant coating layer. In addition, the heat-resistant coating layer may be formed on one surface of the porous substrate, and the electrode adhesive layer may be formed on both surfaces thereof. The heat-resistant coating layer and the electrode adhesive layer may also be formed by stacking of two or more layers.

In an aspect of the present invention, the electrode adhesive layer may have a thickness of 0.1 to 3 μm, specifically 0.2 to 2.0 μm, and more specifically 0.3 to 1.0 μm. Although the thickness is not limited to the above range, in the above ranges, it may be appropriate to achieve the desired Gurley permeability and the Gurley permeability change rate after fusion.

In an aspect of the present invention, the composite separator may have a peel strength of 10 to 150 gf/25 mm, specifically 20 to 130 gf/25 mm, and more specifically 30 to 110 gf/25 mm when the composite separator is stacked on a carbon sheet having a thickness of 200 μm so that the electrode adhesive layer faces the carbon sheet, the composite separator and the carbon sheet are pressed and fused at 4 MPa and 70° C. for 1 second, and then subjected to a 180 degree peel test. When the electrode assembly is manufactured in the above ranges, the occurrence of distortion or lifting phenomenon may be suppressed. Therefore, also the battery capacity may be maximized, and a battery having excellent cycle characteristics may be provided.

[Manufacturing Method]

In an aspect of the present invention, a method of forming the electrode adhesive layer may allow a more robust coating layer to be formed while the interface between the electrode adhesive layer and the heat-resistant coating layer is mixed, by applying the slurry for the heat-resistant coating layer, followed by the slurry for electrode adhesive layer onto the porous substrate without undergoing the process of drying. It is, however, also possible to apply the slurry for the heat-resistant coating layer, undergo the process of drying, and then apply the slurry for the electrode adhesive layer. However, more preferred is continuous coating without drying.

The coating method is not limited, and specifically may be, for example, a conventional coating method such as bar coating, dip coating, and spray coating.

In addition, in the process of drying after coating, drying is preferably performed at a temperature up to the temperature at which the polyolefin-based organic particles used in the electrode adhesive layer are filmed. Drying may be specifically performed at 45° C. or less, and more preferably 40° C. or less.

Hereinafter, the present invention will be described in more detail on the basis of Examples and Comparative Examples. However, the following Examples and Comparative Examples are an example for describing the present invention in more detail, and the present invention is not limited by the following Examples and Comparative Examples.

Hereinafter, the physical properties were measured as follows.

1. Gurley Permeability

A Gurley permeability was measured as a gas permeability. The Gurley permeability was measured according to ASTM D726 standard using a densometer manufactured by Toyoseiki. The time taken for 100 cc of air to pass through the area of 1 square inch of the separator was recorded in seconds, and the values were compared.

2. ΔP (Gurley Permeability after Fusion)

Gurley permeability after fusion was measured according to ASTM D726 standard using a densometer manufactured by Toyoseiki, after stacking the composite separator between two TEFLON® sheets, followed by pressing and fusing the composite separator and the TEFLON® sheets at 4 MPa and 70° C. for 1 second using a heat press machine.

$\Delta P=(G_2-G_1)/G_1 \times 100$, $G_2$ is a Gurley permeability measured according to ASTM D726 in a state where the composite separator and the TEFLON® sheets are fused, and the TEFLON® sheets are then removed, and $G_1$ is a Gurley permeability of the composite separator before fusion.

3. Peel Strength (Fusing Force)

A carbon sheet having a thickness of 200 μm (manufactured by TOYO TANSO KOREA CO., LTD., product name: PF-20HP) was used instead of an electrode.

Peel strength was measured after stacking so that the electrode adhesive layer of the composite separator faces on the carbon sheet, and then pressing and fusing the composite separator and the carbon sheet at 4 MPa and 70° C. for 1 second using a heat press machine. The peel strength was measured by a 180° C. peel test method using a tensile measuring apparatus (3343) manufactured by INSTRON.

4. Anti-Blocking Properties

The composite separator coated on both surfaces was wound by 1000 m on a roll, and left to stand at room temperature for 3 days to determine whether the adhesive was achieved by fusion between the innermost composite separators of a core.

OK is a case where blocking between film surfaces does not occur, and NG is a case where blocking between film surfaces occurs.

5. Weight Change Rate Upon Immersion in Electrolyte Solution (Swelling Properties)

An aqueous slurry containing the polyolefin-based organic particles for forming the electrode adhesive layer was placed on a TEFLON® petridish, and water was evaporated at 60° C. for 1 day to prepare a film. Then, the film was left for 3 days in a state in which 1 g of the film is immersed in the electrolyte solution obtained by mixing ethylene carbonate: ethyl methyl carbonate: dimethyl carbonate in a volume ratio of 3:5:2, the electrolyte solution was decanted, and then the film weight was measured to calculate the weight change rate.

Weight change rate=$(W2-W1)/W1 \times 100$ wherein W2 is a weight of the film measured after immersion in the electrolyte solution for 3 days, and W1 is a weight of the film measured before immersion in the electrolyte solution.

6. Degree of Crystallinity

An aqueous slurry containing the polyolefin-based organic particles for forming the electrode adhesive layer was placed on a TEFLON® Petridish, water was evaporated at 60° C. for 1 day to prepare a film, and then the degree of crystallinity was determined by X-ray diffraction.

7. Battery Resistance

1) Preparation of Cathode 94 wt % of $LiCoO_2$ as a cathode active material, 2.5 wt % of polyvinylidene fluoride as a fusing agent, and 3.5 wt % of carbon black as a conductive agent were added to N-methyl pyrrolidone as a solvent so that the solid content was 50 wt % and stirring was performed to prepare a uniform cathode slurry. The cathode slurry was coated on an aluminum foil having a thickness of 30 μm, which was dried and pressed to prepare a cathode plate having a thickness of 150 μm.

2) Preparation of Anode 95 wt % of artificial graphite as an anode active material, 3 wt % of an acryl-based latex having a $T_g$ of −52° C. as a fusion agent, and 2 wt % of carboxymethyl cellulose as a thickener were added to water as a solvent so that the solid content was 48 wt % and stirring was performed to prepare a uniform anode slurry. The anode slurry was coated on a copper foil having a thickness of 20 μm, which was dried and pressed to prepare an anode plate having a thickness of 150 μm.

A pouch-type battery was assembled in a stacking manner using the composite separator prepared in Examples and Comparative Examples between the cathode and the anode as prepared above. Then, in order to fuse the cathode, the anode, and the separator together, the battery was placed in a heat press machine, heat-fused by applying heat and pressure at 70° C. and 4 MPa, and then the electrolyte solution in which 1 M lithium hexafluorophosphate ($LiPF_6$) was dissolved and ethylene carbonate: ethyl methyl carbonate: dimethyl carbonate were mixed in a volume ratio of 3:5:2, was injected to manufacture a lithium secondary battery having a capacity of 65 mAh.

In the following table, BEST means that the resistance is lower than the reference sample having electrical resistance of 750 mΩ, BETTER means that the resistance is equivalent to that of the reference sample, HIGH means that the resistance is 20% to 50% higher than the reference sample, and BAD means that the resistance is 50% or more higher than the reference sample.

8. Battery Life Characteristics

Each of batteries manufactured through the assembly process was charged and discharged 100 times at a discharge rate of 1 C, and then a cycle evaluation was performed to measure the degree of reduction relative to the initial capacity by measuring the discharge capacity.

A sharp drop in initial life means that the capacity retention rate drops by 20% or more within 50 cycles.

Example 1

<Preparation of Slurry for Heat-Resistant Coating Layer>

94 wt % of alumina particles having average particle size of 0.7 μm, 2 wt % of polyvinyl alcohol having a melting temperature of 220° C. and a saponification degree of 99%, and 4 wt % of an acryl-based latex having a $T_g$ of −52° C. were added to water as a solvent so that the solid content was 40 wt % and stirring was performed to prepare a slurry for the heat-resistant coating layer which was mixed uniformly.

<Preparation of Slurry for Electrode Adhesive Layer>

Polyolefin-based latex (solid content 35 wt %), in which the polyolefin-based particles having an average particle size of 0.2 μm, a $T_m$ of 155° C. and a glass transition temperature of 0° C. (polypropylene copolymer copolymerized with 1.5 mol % acrylic acid) were dispersed in water to maintain a spherical shape, was diluted in water so that the solid content was 10 wt % to prepare a slurry for electrode adhesive layer.

<Preparation of Composite Separator>

The heat-resistant coating layer slurry was applied to one surface of a polyethylene-based porous substrate having a Gurley permeability of 150 sec/100 cc and a thickness of 9 μm (SK Innovation Co., Ltd., ENPASS) using the multilayer slot coating die, and at the same time, the slurry for electrode adhesive layer was immediately coated without drying. After coating at a speed of 10 m/min, respectively, it was dried through a 40° C. hot air dryer having a length of 6 m and wound up in roll shape. The heat-resistant coating layer had a thickness of 2.5 μm, and the electrode adhesive layer had a thickness of 0.5 μm. The content of polyolefin-based particles in the electrode adhesive layer was 0.6 g/m².

The physical properties of prepared composite separator were measured and are shown in Table 1 below.

Example 2

As shown in Table 1 below, a composite separator was prepared in the same manner as in Example 1, except that the type of the polyolefin-based latex used in the slurry for the electrode adhesive layer was changed.

The physical properties of prepared composite separator were measured and are shown in Table 1 below.

Examples 3 and 4

As shown in Table 1 below, a composite separator was prepared in the same manner as in Example 1, except that content of the polyolefin-based organic particles in the electrode adhesive layer and coating thickness were changed.

The physical properties of prepared composite separator were measured and are shown in Table 1 below.

Comparative Example 1

As shown in Table 1 below, a composite separator was prepared in the same manner as in Example 1, except that the acryl-based binder (styrene acrylic copolymer, solid content 20 wt %) was used.

The physical properties of prepared composite separator were measured and are shown in Table 1 below.

TABLE 1

| | | Example 1 | Example 2 | Example 3 | Example 4 | Comp. Example 1 |
|---|---|---|---|---|---|---|
| Physical properties of binder used in electrode adhesive layer | Particle size (μm) | 0.2 | <0.5 | 0.2 | 0.2 | 0.5 |
| | $T_m$ (° C.) | 155 | 170 | 155 | 155 | — |
| | $T_g$ (° C.) | 0 | 0 | 0 | 0 | 40 |
| | Particle type | Polyolefin-based latex | Polyolefin-based latex | Polyolefin-based latex | Polyolefin-based latex | Acryl-based latex |
| Physical properties of electrode adhesive layer | Content of organic particles (g/m$^2$) | 0.6 | 0.6 | 1.5 | 2 | 0.6 |
| | Thickness (μm) | 0.5 | 0.6 | 1 | 2 | 0.5 |
| | Weight change rate upon immersion in electrolyte solution (%) | 31 | 43 | 31 | 31 | 542 |
| Physical properties of composite separator | Gurley permeability (sec/100 cc) | 205 | 204 | 260 | 299 | 220 |
| | Gurley permeability after fusion (sec/100 cc) | 253 | 246 | 320 | 395 | 600 |
| | ΔP (%) | 23.41 | 20.59 | 23.08 | 32.10 | 172.73 |
| | Peel strength (gf/25 mm) | 60 | 30 | 80 | 110 | 109 |
| | Whether antiblocking occurs | OK | OK | OK | OK | NG |
| | Degree of crystallinity | Yes | Yes | Yes | Yes | No |
| | Battery resistance | BEST (660 mΩ) | BETTER (701 mΩ) | BETTER (710 mΩ) | BETTER (720 mΩ) | BAD (1180 mΩ) |
| | Battery life characteristics | 100 cycle life retention rate: 97% | 100 cycle life retention rate: 90% | 100 cycle life retention rate: 95% | 100 cycle life retention rate: 92% | Sharp drop in initial life |

As shown in Table 1, it was found that the composite separator of the present invention had a small change in Gurley permeability after fusion, a small weight change upon immersion in the electrolyte solution, and excellent battery life characteristics.

In the composite separator for a secondary battery according to an aspect of the present invention, distortion or lifting phenomenon is suppressed even when the heat and pressure are applied without significant decrease in permeability of the separator. Therefore, cycle characteristics are excellent and a desired capacity may be achieved.

It is possible also to provide a composite separator, which is not easily swollen or decomposed in the electrolyte solution and thus has more excellent cycle characteristics, and which is excellent in slip properties and thus has anti-blocking properties.

In addition, according to an aspect of the present invention, during the integration process of the electrode and the separator, no lifting phenomenon on the electrode surface and the separator surface occurs; when the electrode and the separator are integrated, the slip properties are improved, such that assemblability between the electrode surface and the separator is improved; the composite separator is easily seated on an electrode surface due to slip properties, or the like upon assembly, such that no wrinkles occur; and no distortion or lifting phenomenon between the electrode and the separator occurs.

In addition, according to an aspect of the present invention, it is possible to provide a composite separator that allows the manufacture of a battery having excellent cycle characteristics and capable of achieving a desired high capacity.

Further, a composite separator according to an aspect of the present invention may provide a composite separator capable of improving a blocking phenomenon between coating layers upon winding a prepared product.

Hereinabove, although the present invention has been described by specific matters, the limited embodiments and drawings, they have been provided only for assisting in a more general understanding of the present invention. Therefore, the present invention is not limited to the exemplary embodiments. Various modifications and changes may be made by those skilled in the art to which the present invention pertains from this description.

Therefore, the spirit of the present invention should not be limited to the above-mentioned embodiments, but the claims and all of the modifications equal or equivalent to the claims are intended to fall within the scope and spirit of the present invention.

What is claimed is:

1. A composite separator comprising:
a porous substrate, a heat-resistant coating layer formed on both surfaces of the porous substrate, and an electrode adhesive layer, characterized in that:
the electrode adhesive layer includes polypropylene-based organic particles having a melting temperature of 120° C. to 180° C. and a glass transition temperature of −30° C. to 10° C.;
the composite separator has a peel strength of 30 to 110 gf/25 mm when the composite separator is stacked on a carbon sheet having a thickness of 200 μm so that the electrode adhesive layer faces the carbon sheet, the composite separator and the carbon sheet are pressed and fused at 4 MPa and 70° C. for 1 second, and then subjected to a 180 degree peel test;
the polypropylene-based organic particles have a weight change rate of less than 50% upon immersion in an electrolyte solution; and
a Gurley permeability satisfies the following Equation 1 and a Gurley permeability change rate (ΔP) satisfies the following:

$$G_1 \leq 300 \quad \text{[Equation 1]}$$

$$10\% \leq \Delta P \leq 50\% \quad \text{[Equation 2]}$$

wherein $\Delta P=(G_2-G_1)/G_1 \times 100$, $G_2$ is a Gurley permeability measured according to ASTM D726 in a state where the composite separator is stacked between two PTFE sheets, the composite separator and the PTFE sheets are pressed and fused at 4 MPa and 70° C., and the PTFE sheets are then removed, and $G_1$ is a Gurley permeability of the composite separator before the fusion, where a unit of the Gurley permeability is sec/100 cc, and wherein the weight change rate is measured according to the following equation 3, $$\text{weight change rate}=(W2-W1)/W1 \times 100 \quad \text{[Equation 3]}$$

wherein W2 is a weight of the polypropylene-based organic particles measured after immersion in the electrolyte solution for 3 days, and W1 is a weight of the polypropylene-based organic particles measured before immersion in the electrolyte solution.

2. The composite separator of claim 1, wherein the polypropylene-based organic particles are included in an amount of 0.5 to 2 g/m² in the electrode adhesive layer.

3. The composite separator of claim 1, wherein the polypropylene-based organic particles have an average particle size of 0.01 to 0.5 μm.

4. The composite separator of claim 1, wherein the polypropylene-based organic particles are spherical particles.

5. An electrochemical device comprising the composite separator of claim 1.

* * * * *